June 18, 1935.  W. STRICKER  2,005,599
AUTOMATIC FOOD MOLDING AND WRAPPING MACHINE
Filed Oct. 13, 1933  9 Sheets-Sheet 1

INVENTOR:
William Stricker,
BY
F. G. Fischer,
ATTORNEY

June 18, 1935.  W. STRICKER  2,005,599
AUTOMATIC FOOD MOLDING AND WRAPPING MACHINE
Filed Oct. 13, 1933  9 Sheets-Sheet 2

INVENTOR:
William Stricker,
BY
F. G. Fischer,
ATTORNEY.

June 18, 1935. W. STRICKER 2,005,599
AUTOMATIC FOOD MOLDING AND WRAPPING MACHINE
Filed Oct. 13, 1933 9 Sheets-Sheet 3

FIG. 3.

INVENTOR:
William Stricker
BY
F. G. Fischer,
ATTORNEY.

June 18, 1935.  W. STRICKER  2,005,599

AUTOMATIC FOOD MOLDING AND WRAPPING MACHINE

Filed Oct. 13, 1933   9 Sheets-Sheet 4

June 18, 1935. W. STRICKER 2,005,599
AUTOMATIC FOOD MOLDING AND WRAPPING MACHINE
Filed Oct. 13, 1933 9 Sheets-Sheet 7

INVENTOR:
William Stricker,
By F. G. Fischer,
ATTORNEY.

Patented June 18, 1935

2,005,599

UNITED STATES PATENT OFFICE 2,005,599

AUTOMATIC FOOD MOLDING AND WRAPPING MACHINE

William Stricker, Kansas City, Mo.

Application October 13, 1933, Serial No. 693,430

13 Claims. (Cl. 93—7)

My invention relates to a new and useful machine for forming and wrapping various kinds of foods such, for instance, as tamales, candies and the like.

The machine embodies an organization of co-acting parts for forming one kind of food, such, for instance, as prepared meats into a core and then surrounding said core with a jacket of another kind of food such as a cereal mush.

The machine also includes mechanism for shaping the food into a strip, cutting said strip into articles of uniform length, and then wrapping said articles.

The present invention is an improvement over my U. S. patent of July 31, 1923, No. 1,463,636, the improvements applying generally to the wrapping mechanism as will appear in the following specification and claims and as illustrated in the accompanying drawings, in which:—

Figures 1, 27:
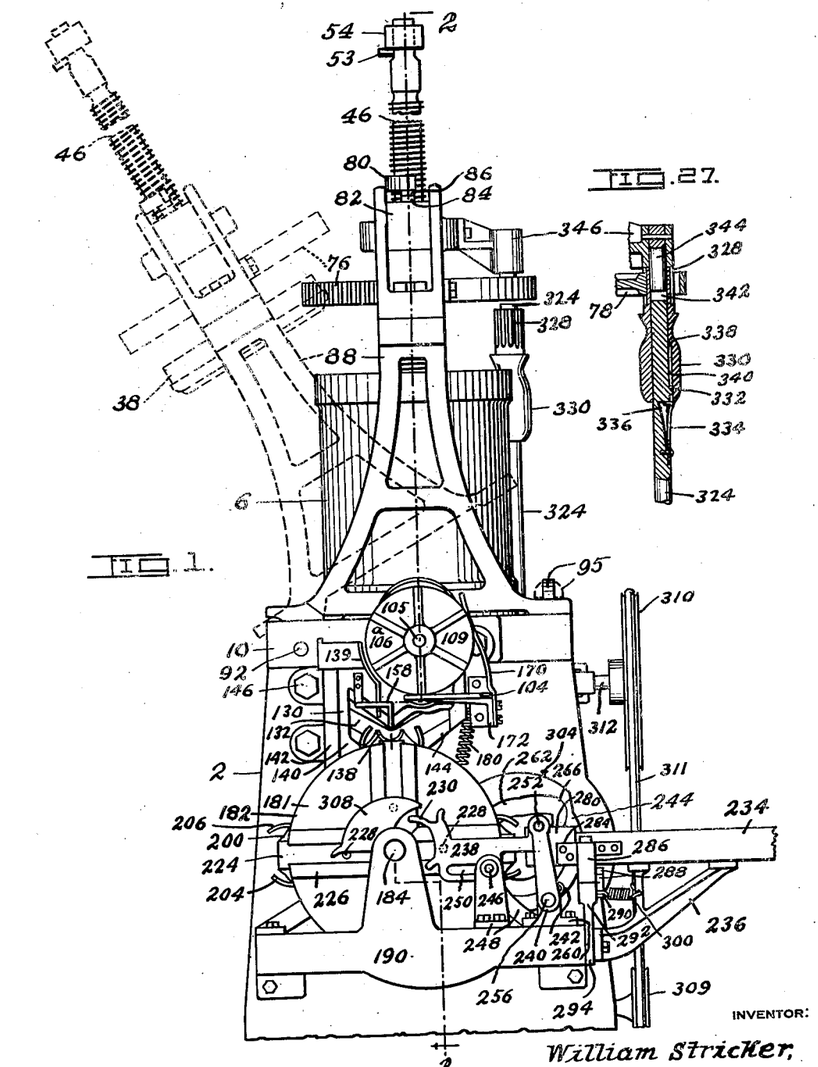
Fig. 1 is a front elevation of the machine with the upper portion thereof tilted to one side in dotted lines so that access may be readily had to food receptacles employed in carrying out the invention.
Fig. 27 is a vertical fragmentary sectional view of a portion of the gearing employed in carrying out the invention.
Figure 2:
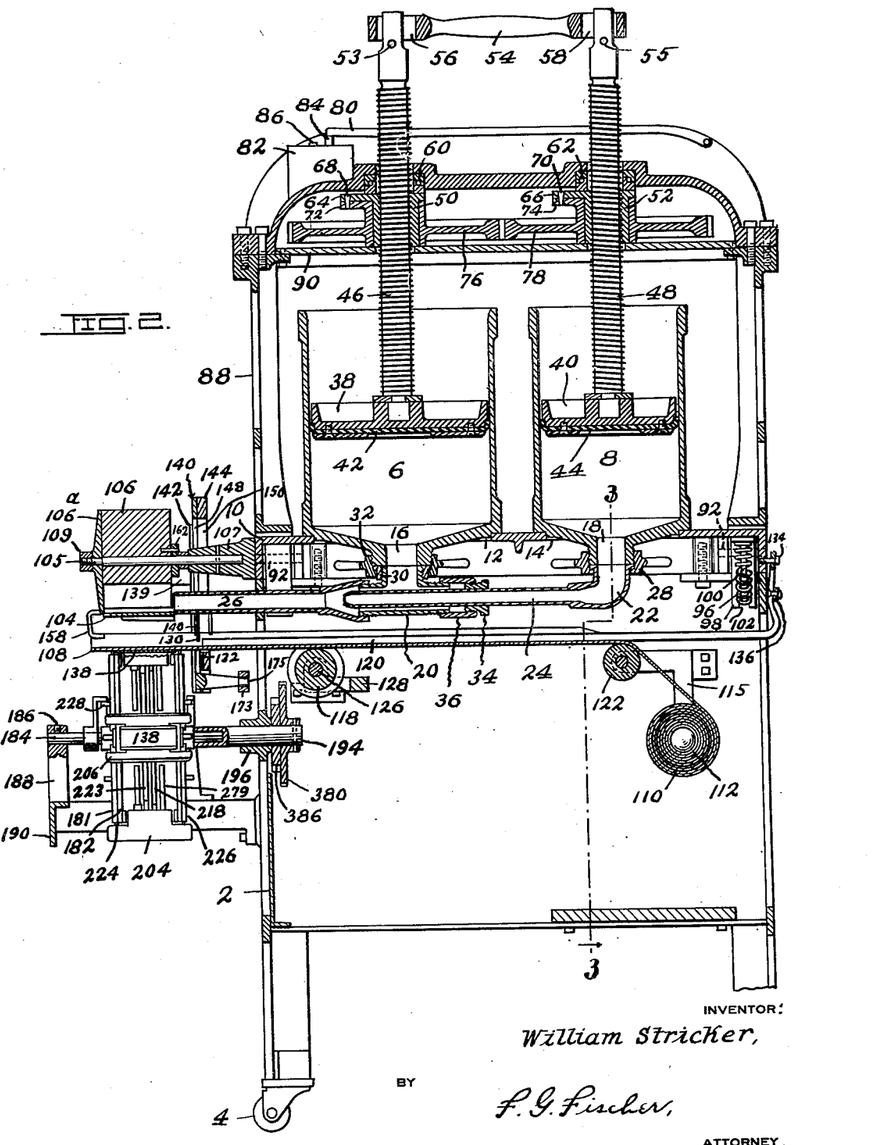
Fig. 2 is an irregular vertical sectional view on line 2—2 of Fig. 1, with some parts removed and others in elevation.

On referring to Figs. 1 and 2 it will be seen that the frame of the machine is in the form of a stand or table 2 mounted upon casters 4 so that the machine can be readily moved from one place to another.

6 and 8 designate receptacles for holding the material to be formed or shaped by the machine. If tomales are to be formed, cooked mush made from corn meal or some other cereal is placed in the receptacle 6, and cooked meat, or a combination of meats, is placed in the receptacle 8. The receptacles 6 and 8 are removably seated upon the table top 10 which has openings 12 and 14 through which the slightly conical bottom portions of the receptacles 6 and 8, respectively, project. The bottoms of the receptacles 6 and 8 have outlet nipples 16 and 18, respectively, the former of which communicates with a T-coupling 20 and the latter with an elbow 22 carrying a nozzle 24 which extends axially through the T-coupling 20 and into the enlarged rear portion of a nozzle 26 connected to the forward end of the T-coupling, Fig. 1.

In order that the different parts may be readily disconnected from each other so that they can be cleansed and kept in a sanitary condition, the elbow is removably connected to the nipple 18 by a nut 28 while the T-coupling 20 is removably connected to the nipple 16 by an adjustable nut 30 and a lock nut 32. The adjustable nut 30 permits the T-coupling 20 to be adjusted up or down sufficiently to bring it in axial alinement with the nozzle 24, which latter is then secured in such alinement by a bushing 34 threaded into a coupling 36 which is screwed upon the rear end of the T-coupling 20.

Means for forcing the material from the receptacles 6 and 8 into the nozzles 26 and 24 is provided in the form of plungers 38 and 40, respectively. The plungers 38 and 40 have suitable gaskets 42 and 44 which snugly fit within the receptacles 6 and 8, so that as said plungers move downwardly they will force the material out through the respective nipples 16 and 18. The plungers 38 and 40 are equipped with stems 46 and 48, one of which has right threads and the other left threads which fit into corresponding threads in rotary nuts 50 and 52 through which the stems 46 and 48, respectively, extend. The plunger stems 46 and 48 are advanced longitudinally when the nuts 50 and 52 are rotated, but prevented from rotating with said nuts by means of a cross bar 54 having rectangular apertures 56 and 58 which fit over the rectangular upper ends of the stems 46 and 48, respectively. The ends of the bar 54 rest upon pins 53 and 55 extending transversely through the upper portions of the stems 46 and 48, respectively. The upper ends of the nuts 50 and 52 bear against ball bearings 60 and 62, respectively, which reduce to a minimum the friction imposed by the end thrust upon said nuts when the plungers 38 and 40 are forcing material from the respective cylinders. The nuts 50 and 52 are provided with laterally projecting arms 64 and 66 connected by break-pins 68 and 70 to arms 72 and 74 on the hubs of a pair of intermeshing gear wheels 76 and 78, which rotate the nuts 50 and 52, to effect downward movement of the stems 46 and 48, respectively. By providing the break-pins 68 and 70, which are weaker than the arms 64, 66, 72 and 74, damage to the nuts 50 and 52, or to the gear wheels 76 and 78 is impossible should either of the plungers 38 or 40 meet with sufficient resistance to prevent their downward movement in the respective receptacles 6 and 8.

Figure 3:
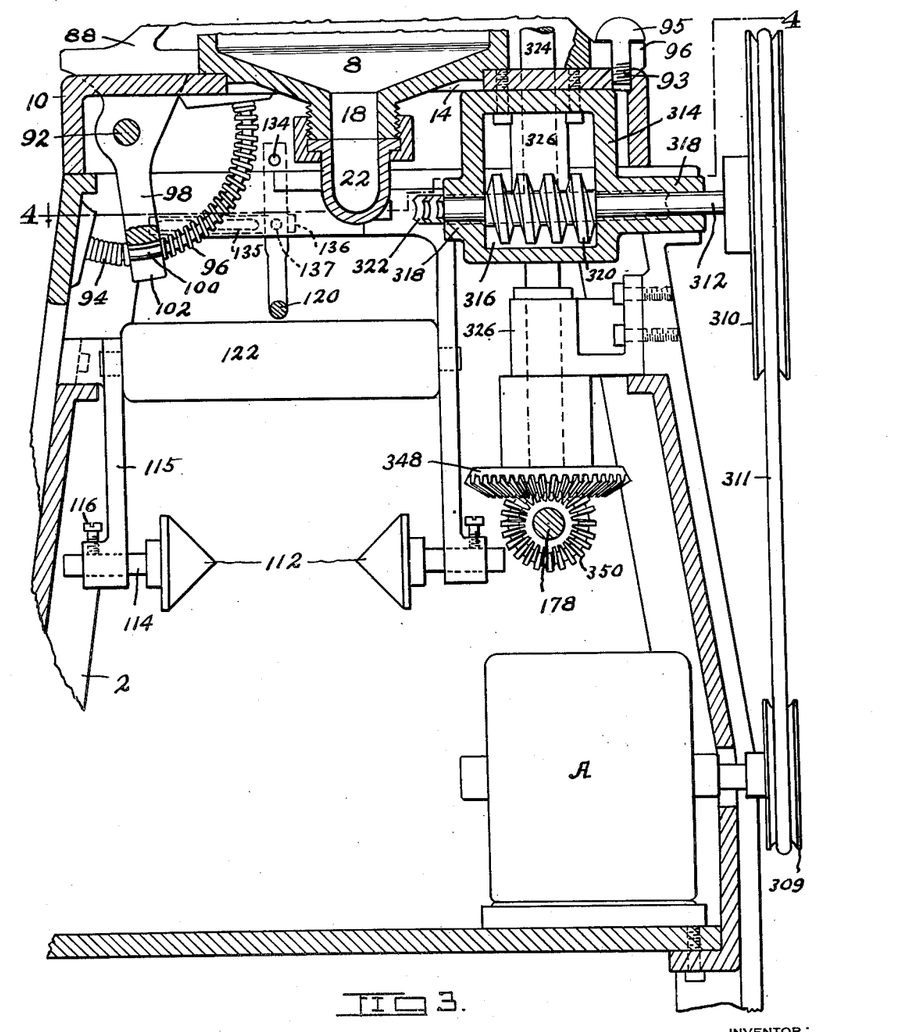
Fig. 3 is an enlarged fragmentary cross sectional view of the machine on line 3—3 of Fig. 2 with some of the parts removed.

Just prior to the plungers 38 and 40 reaching the end of their downward stroke, which is immediately above the bottoms of the respective receptacles 6 and 8, the transverse pin 53 engages and depresses the underlying end of a lever 80, causing the same to open a switch 82 controlling an electric circuit, not shown, leading from a suitable source of supply to a prime mover preferably in the form of an electric motor A, Fig. 3, which drives the gear wheels 76 and 78 through a reduction train hereinafter described. By thus providing automatic means for stopping the downward movement of the plungers 38 and 40 all danger of said plungers contacting with the bottoms of the receptacles 6 and 8, respectively, and thereby causing damage is avoided. The switch 82 may be of any well-known form with a push button 84 to effect closing of the circuit and a push button 86 for opening said circuit. After the plungers 38 and 40 reach the end of their downward movement they may be quickly raised above the respective receptacles 6 and 8 by rotating the stems 46 and 48 in the right direction while the nuts 50 and 52 are held stationary by respective gear wheels 76 and 78. Rotation of the stems 46 and 48 can be readily accomplished by removing the bar 54 and substituting a suitable hand crank (not shown) which is applied first to the upper end of one stem and then the other.

The thrust bearings 60 and 62 are mounted in the upper portion of a yoke 88 having a longitudinal bar 90 for supporting the gear wheels 76 and 78 and for cooperating with said thrust bearings in preventing vertical movement of the gear wheels 76 and 78 upon the stems 46 and 48, respectively.

The yoke 88 is connected at one side to the table top 10 by pivots 92 so that after the plungers 38 and 40 have been raised above the receptacles 6 and 8 said yoke and parts carried thereby may be tilted to the dotted line position disclosed by Fig. 1 in order that material may be readily placed within said receptacles 6 and 8, or so that said receptacles may be removed from the table top for sterilization. Set screws 93 threaded in the top of the table 2, serve to hold the yoke 88 from tilting when the machine is in operation. The set screws 93 have narrow heads 95 to permit the slotted ends 97 of the yoke to pass when said heads are turned as shown on Fig. 3.

In order to partially counterbalance the weight of the yoke 88 and parts carried thereby and also to relieve the same of shock, or jar when the yoke reaches the end of the full or dotted line positions Fig. 1, I provide coil springs 94 and 96, Figs. 2 and 3, which are disposed at opposite sides of an arm 98 depending from one of the pivoted ends of the yoke 88. The springs 94 and 96 are mounted upon a segmental rod 100, extending through the bifurcated lower end 102 of the arm 98, and fixed at its ends to the upper portion of the table 2.

Figure 12:
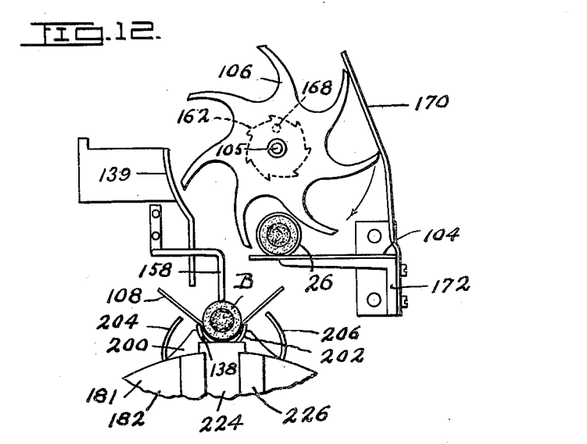
Fig. 12 is a front elevation of a rotary cutting mechanism, with some associated parts, for cutting the material into articles of uniform length.
Figure 14:
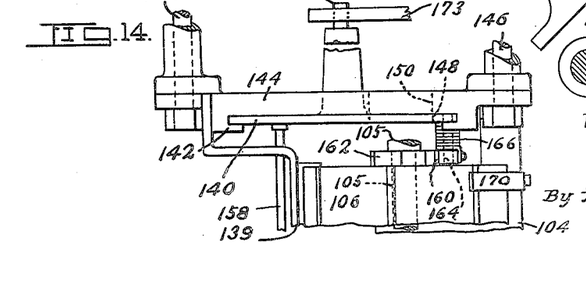
Fig. 14 is a broken plan view of some of the parts disclosed by Figs. 12 and 13.

Referring again to the nozzles 24 and 26, Fig. 2, which shape the material as it is forced therethrough it may be proper to state that said material is of such consistency and the pressure applied thereto is so great that it holds its shape and emerges from the nozzle 26 in the form of a strip which passes upon a shelf 104 and between two blades of a series forming part of a rotary cutter 106, Figs. 2, 12 and 14. The rotary cutter 106 is freely mounted upon a stationary shaft 105 carried by a bracket 107 projecting from the forward end of the table 2. A circular plate 106a, held upon the shaft 105 by a nut 109, serves to prevent displacement of the cutter 106.

When the strip of material is forced from the nozzle 26 a distance equal to the length of the articles into which said strip is to be cut the rotary cutter 106 is advanced one step and thus severs an article B from said strip at a point close to the discharge end of the nozzle 26. The blade that severs the article B from the strip also pushes said article off the shelf 104 upon a strip of wrapping paper 108 extending forwardly from a roll 110, Fig. 2, mounted in the rear of the table 2 upon a pair of conical rollers 112 fixed upon shafts 114 mounted in brackets 115 secured to the table 2. The shafts 114 are frictionally engaged by set screws 116 to retard the rotation of the rollers 112 so that they will coact with a feed roller 118 and a rod 120 in holding the strip of paper 108 under tension. The strip of paper 108, in its passage to the feed roller 118 runs over a guide roller 122 journaled in the brackets 115. The feed roller 118 is fixedly mounted upon a shaft 126 journaled in a bearing 128 and is driven by an intermittent movement hereinafter described.

Figure 13:
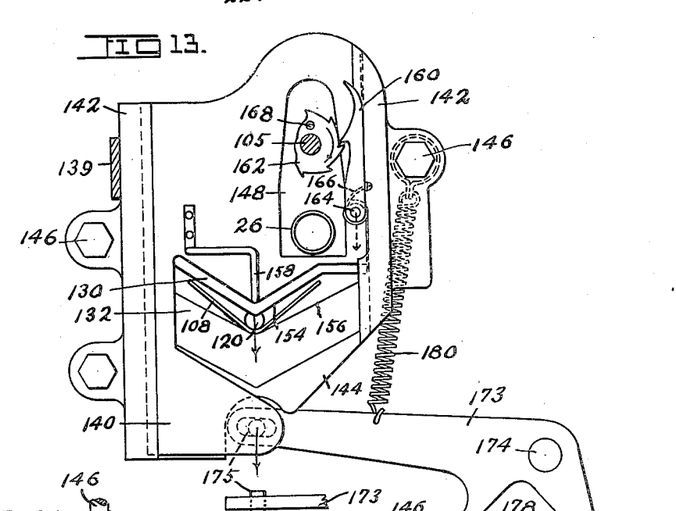
Fig. 13 is a front elevation partly in section of mechanism for cutting wrappers of uniform length from a strip of paper or other suitable material.
Figures 16, 17:
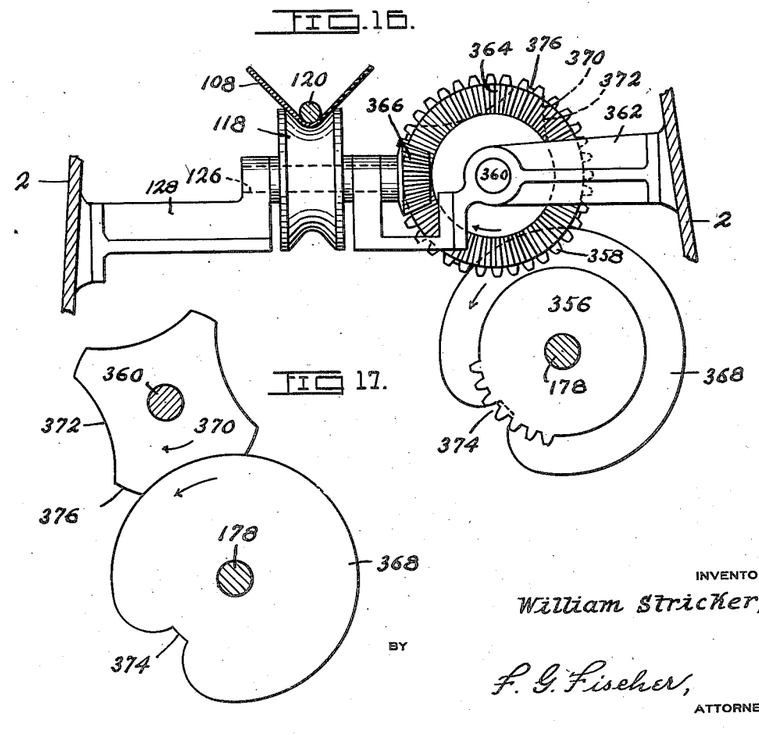
Fig. 16 is an irregular broken cross sectional view on line 16—16 of Fig. 4.
Fig. 17 is a front elevation of lock gearing for cooperating with intermittent gearing which drives a paper feed roller, the shafts of said gearing being in cross section.

The feed roller 118 has a circumferential V-shaped groove, Fig. 16, which coacts with the rod 120 in partially holding the paper longitudinally and in guiding it through an opening between a reciprocatory knife 130 and a stationary blade 132, Fig. 13. The rear end of the rod 120 is bent upwardly at approximately right angles and adjustably secured to the rear portion of the table 2 by a set screw 134 and a bar 136 to which latter the rod 120 is connected by a pivot 137. The set screw 134 is threaded into the table 2 and by adjusting it forwardly the rod 120 is caused to move downwardly and hold the paper in contact with the feed roller 118 with the desired pressure. The bar 136 has a slot 135 through which a set screw 133 extends and is threaded into the table, Fig. 4. By loosening the set screw 133 the bar 136 may be adjusted laterally to bring the rod 120 centrally over the groove in the feed roller 118. As the strip of paper 108 is fed forwardly one step by the feed roller 118 it passes into position over one of a series of receivers in the form of trays 138 to receive the article B after it has been pushed from the shelf 104 by the rotary cutter 106, as above stated. A guard 139, carried by a supporting member 144, coacts with the shelf 104 in directing the article B into the paper in the underlying tray 138. After receiving the article B the paper strip 108 is cut into the length of a wrapper C by the knife 130 and the blade 132. The knife 130 is fixed upon a plate 140 reciprocably mounted in vertical slideways 142 of the supporting member 144 which is secured to the front portion of the table by bolts 146. The reciprocatory plate 140 and the supporting member 144 have vertically disposed registering slots 148 and 150 through which the nozzle 26 and the shaft 105 of the rotary cutter 106 project, Figs. 2, 13 and 14. The knife 130 and the blade 132 have substantially V-shaped cutting edges 154 and 156, respectively, to conform somewhat to the partially folded strip 108.

As the wrapper C is being cut from the strip 108 said wrapper is forced downwardly into the underlying tray 138 by means of a presser foot 158 secured to the reciprocatory plate 140. As the plate 140 descends it rotates the cutter 106 one step through the intermediary of a pawl 160 and a ratchet wheel 162, which latter is freely mounted for rotation upon the shaft 105. The pawl 160 is mounted upon a pivot 164 projecting from the plate 140, and said pawl is yieldably pressed against the ratchet wheel 162 by a spring 166. The ratchet wheel 162 is connected to the rotary cutter 106 by suitable means such as a pin 168. After the rotary cutter 106 has been thus advanced one step it is immediately checked by a resilient brake shoe 170 secured to a bracket 172 carrying the shelf 104.

The reciprocatory plate 140, carrying the knife 130, is moved downwardly by a lever 173 fulcrumed at 174 and having a pin and slot connection 175 with the lower end of said plate 140. The lever 173 is swung on its downward stroke by a rotary cam 176 mounted upon a shaft 178 intermittently driven by a train hereinafter described. The lever 173 is swung on its upward stroke by a retractile spring 180 secured at one end to one of the bolts 146 and at its opposite end to said lever 172.

Figures 5, 6:
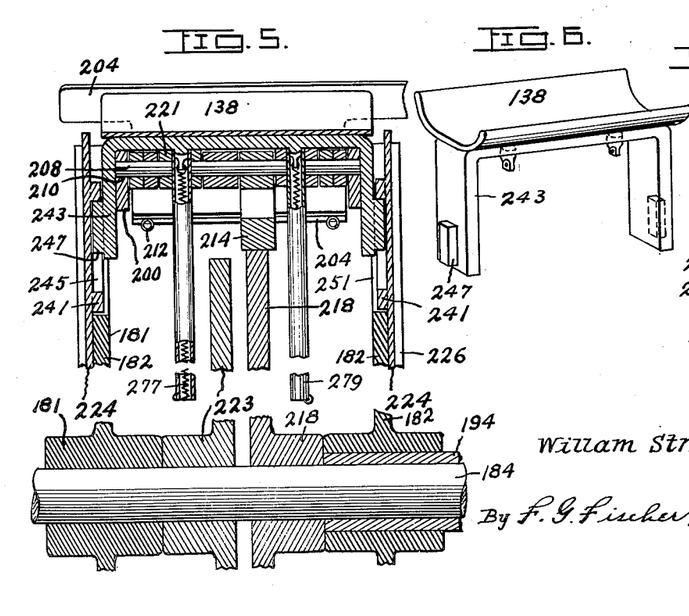
Fig. 5 is an enlarged broken vertical sectional view on line 5—5 of Fig. 11.
Fig. 6 is a detail perspective view of one of a series of trays in which the articles are held while being wrapped.

The trays 138 form part of a rotary carrier 181 upon which the major portion of the wrapping mechanism is mounted. The carrier 181 also includes a pair of disks 182. The forward disk is rotatably mounted upon a stationary shaft 184 fixed at its forward end as by a set screw 186 in a bearing 188 mounted upon a bracket 190 secured to the forward end of the table 2. The rear end of the shaft 184, Figs. 2 and 5, is supported in the tubular forward end of a rotary shaft 194 upon which the rearmost disk 182 is fixedly mounted. The shaft 194 is journaled in a bearing 196, at the forward end of the table 2, and driven step by step by mechanism hereinafter described. The disks 182 are rigidly connected by transverse saddles 198 having flanges 200 riveted or otherwise suitably fixed to the adjacent sides of the respective disks 182 and provided with seats 202 for the reception of the trays 138 when the latter occupy their innermost position, Fig. 10, and the upper, lower, and left hand portion of Fig. 11. The saddles 198 are four in number in the present instance and equally spaced apart as shown by Fig. 11.

Each tray 138 has associated therewith curved folder blades 204 and 206 forming important elements of the wrapping mechanism. The blades 204 and 206 are mounted upon pivots 208, the two outermost ones of which are mounted in openings 210, Figs. 5 and 20, in the flanges 200 of the saddles 198. The blades 204 and 206 are disposed at opposite sides of the respective tray 138 for the purpose of folding the wrapper B longitudinally around the article, Figs. 22 and 23. Retractile springs 212 yieldably connecting the blades 204 and 206, normally hold the same in inactive position, Figs. 11 and 21. The blade 204 is swung to active position, Figs. 22 and 23, by a lug 214 as the latter slides upon the high radius 216 of a stationary cam 218 fixed upon the stationary shaft 184. The blade 206 is swung to active position by a lever 220 as the latter slides upon the high radius 222 of a stationary cam 223 fixed beside the disk 218 upon the stationary shaft 184, Figs. 5, 11, 21, 22 and 23. The lever 220 is fulcrumed at 219 upon an arm 221 projecting forwardly from the respective saddle 198.

Figures 18, 19, 20, 21, 22, 23, 24, 25:
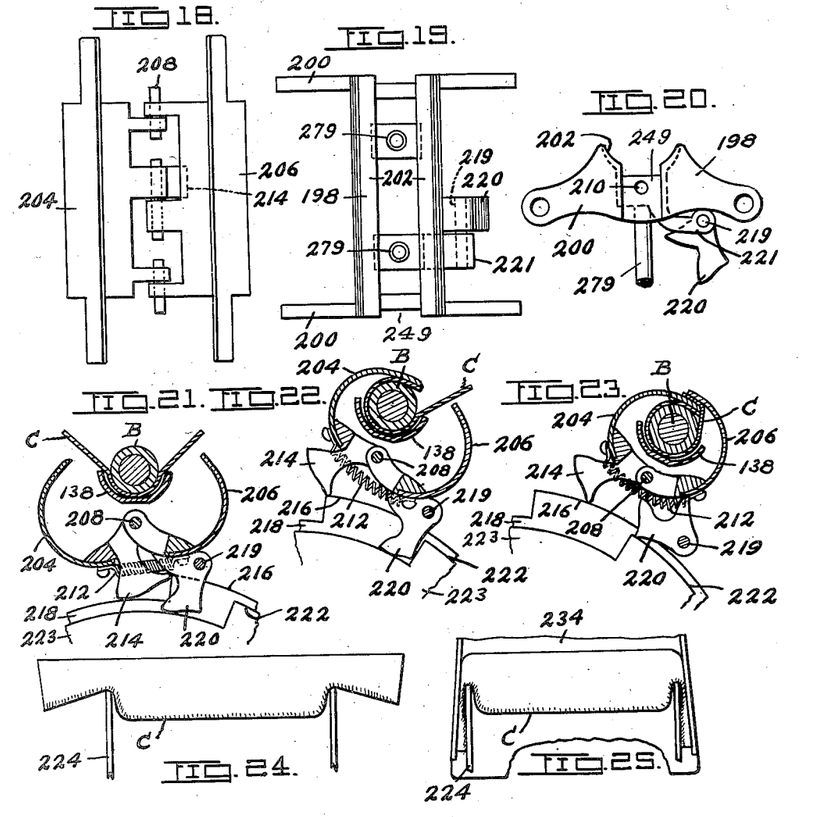
Fig. 18 is a detail plan view of a pair of curved wrapper folding blades which cooperate with other folding devices in folding the wrappers around the respective articles.
Fig. 19 is a detail plan view of one of a plurality of saddles in which the trays disclosed by Fig. 6 are adapted to be seated.
Fig. 20 is a detail side elevation of the saddle.
Fig. 21 is an enlarged broken vertical sectional view on line 21—21 of Fig. 8, showing a pair of the curved blades in initial position and ready to fold a wrapper longitudinally around an article.
Fig. 22 is a view similar to Fig. 21 excepting that one of the blades has advanced and folded one longitudinal margin of the wrapper over the article.
Fig. 23 shows the same parts disclosed by Fig. 22, after the blades have folded both longitudinal margins of the wrapper over the article.
Fig. 24 is a detail side elevation showing initial folds being formed in the ends of the wrapper while held in the position disclosed by Fig. 23.
Fig. 25 shows an intermediate step in the end folding operation of the wrapper.

After the curved blades 204 and 206 have folded the wrapper longitudinally, Fig. 23, the ends of said wrapper are partly folded, Fig. 24, by a pair of reciprocatory blades 224 which are associated with the curved blades 204 and 206 and slidably mounted in guides 226 secured to the outer surfaces of the disks 182. The blades 224 are provided with laterally projecting studs 228, Figs. 5, 8, 9 and 10, which, during rotation of the disks, engage inclined guides 230 and are directed outwardly thereby into grooves 232 concentric with the axis of the shaft 184.

The guides 230 and the grooves 232 form parts of an ejecting mechanism for discharging the partially wrapped article into a receptacle preferably in the form of a trough 234 carried by a supporting member 236 secured to the bracket 192. The ejecting mechanism comprises a pair of reciprocatory members 238 provided at their forward ends with the guides 230 and grooves 232. The members 238 are operated by a pair of levers 240 which in turn are operated by a rotary cam 244. The forward portions of the reciprocatory members 238 are supported by studs 246 carried by supports 248 and projecting through longitudinal slots 250 in the lower portions of said members 238. The rear ends of the members 238 are supported and operably connected to the upper ends of the levers 240 by pivots 252. The levers 240 are united to operate in unison, by a transverse bar 254 and mounted at their lower ends upon stub shafts 256 mounted in bearings 260. The lever 240, nearest to the cam 244, carries an antifriction roller 242 which operates in an irregular groove 262 in the adjacent side of said cam 244. The cam 244 is fixed upon the forward end of the shaft 178 which is continuously driven, by means hereinafter described, while the machine is in operation.

Figure 7:
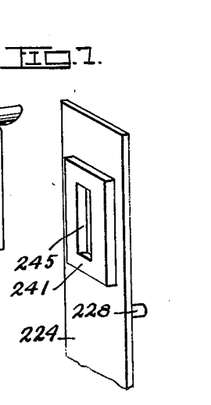
Fig. 7 is a broken detail perspective view of one of a plurality of reciprocatory folding devices for putting the initial folds in the wrappers.
Figure 8:
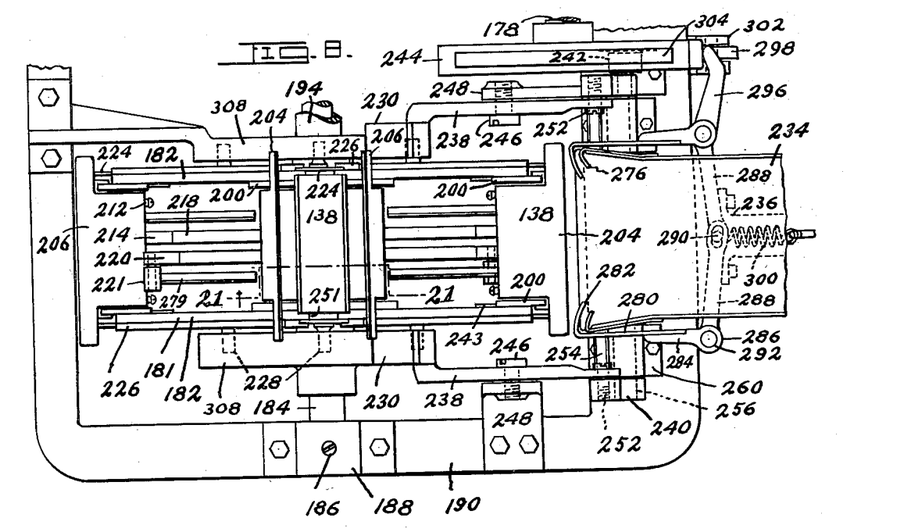
Fig. 8 is a plan view of a wrapper folding mechanism and some of the associated parts.
Figure 10:
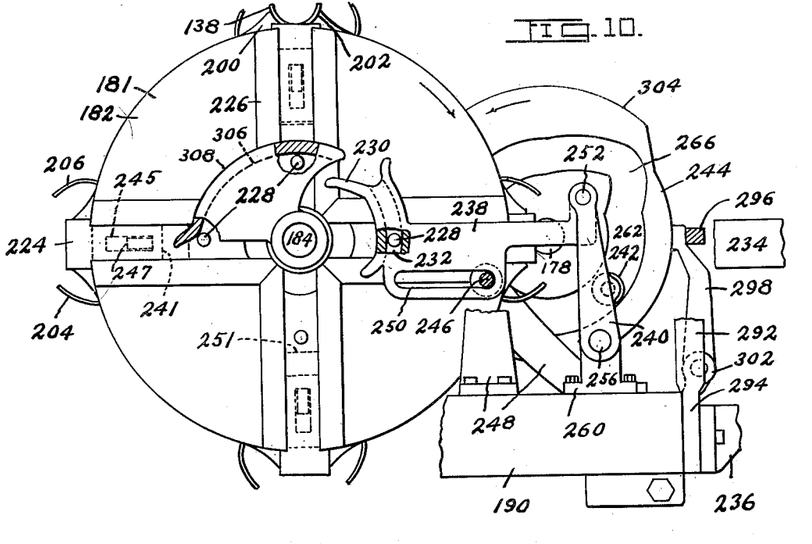
Fig. 10 is a front elevation of a portion of the folding mechanism and some of the associated parts.
Figure 11:
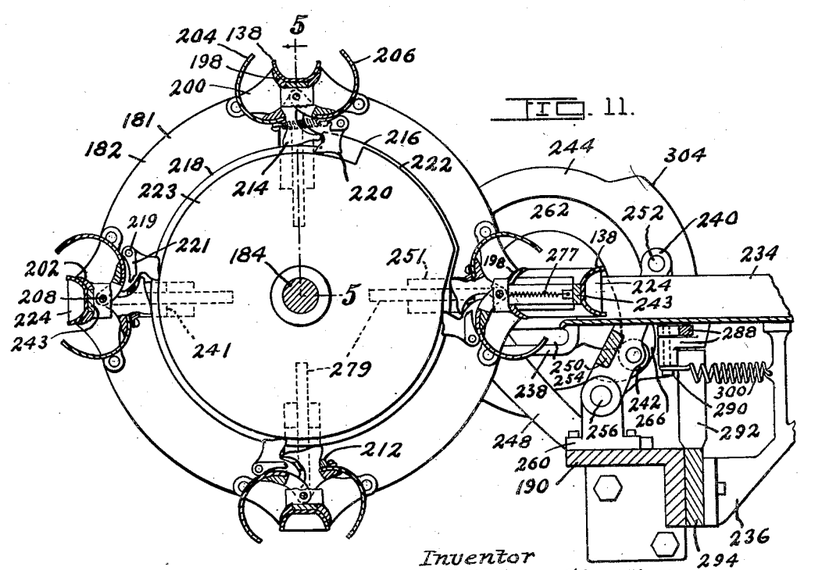
Fig. 11 is an irregular sectional view on line 11—11 of Fig. 9.

During each revolution of the cam 244 the high radius 266 of the grooved portion 262 carries the roller 242 outwardly from the position shown by Fig. 10 to that disclosed by Fig. 11, causing said roller 242 to swing the levers 240 rearwardly and thus pull the reciprocatory members 238 therewith which in turn pull upon the studs 228 and thereby draw the reciprocatory blades 224 outwardly to the end of their movement. The blades 224 have a slidable connection, Figs. 5, 6, 7 and 8, with the tray 138 comprising reinforcements 241, fixed to said blades, and a U-shaped member 243 fixed to said tray. The reinforcements 241 have longitudinal slots 245, Figs. 5 and 7, in which lugs 247, fixed to the U-shaped member, Fig. 6, are slidably mounted to enable the blades 224 to be drawn outwardly a short distance independently of the tray 138 (see right side of Fig. 10) by the respective studs 228 and the guides 230 to partly fold the wrapper, Fig. 24. The parallel arms of the U-shaped member 243 are slidably mounted in grooves 249 (Figs. 19 and 20) in the flanges 200 of the associated saddle 198. The reinforcements 241 and the lugs 247 project into radial slots 251 in the disks 182 of the rotary carrier.

Figure 9:
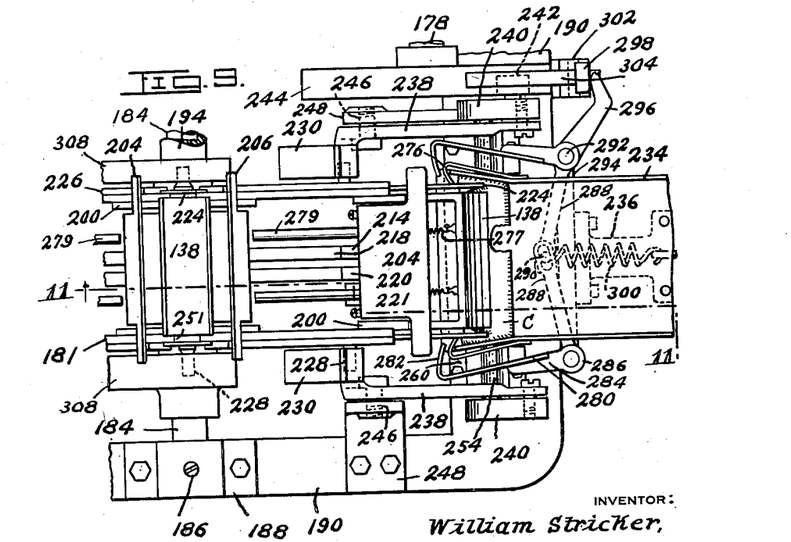
Fig. 9 is a view similar to Fig. 8 with some of the parts broken away and others in an advanced position over that disclosed by Fig. 8.
Figure 26:
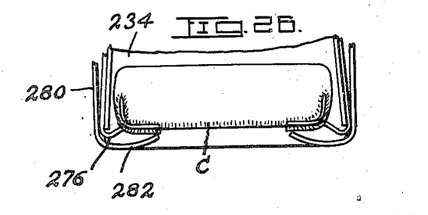
Fig. 26 shows the final step in the end folding operation of the wrapper.

As the blades 224 are drawn outwardly all the way, Figs. 9 and 11, the inner ends of the slots 245 engage the lugs 247 and thus pull the tray 138 outwardly with said blades. During the outward movement of the blades 224 they coact with the sides of the trough 234 in folding the ends of the wrapper C backwardly against the ends of the article B from the position shown by Fig. 24 to that disclosed by Fig. 25. Also during the outward movement of the blades 224 they contact the inwardly turned free ends of a pair of resilient detents 276, secured to the sides of the trough 234, and push them out of the way of the advancing article, but when the blades 224 are moved inwardly as the high radius 266 of the cam 244 passes out of engagement with the roller 242, the detents 276 spring inwardly into engagement with the partially wrapped article and remove it from the inwardly moving tray 138 and deposit it in the trough 234. The tray 138 is moved inwardly with the blades 224, until seated in its saddle 198, by coil springs 277 connected at their outer ends to the U-shaped member 243 and at their inner ends to tubes 279 secured to the saddle 198. Soon after the blades 224 move inwardly and clear the detents 276 a pair of folding devices 280 swing toward each other and complete the folding operation by folding the ends of the wrapper against the back of the article as shown by Fig. 26.

The folding devices 280, which have inturned forward ends 282 for engaging and folding the wrapper as stated, are secured at their rear ends to the forwardly projecting arms 284 of bellcrank levers 286 provided with overlapping arms 288 having a pin-and-slot connection 290 to insure simultaneous operation of said bell-crank levers 286. The bellcrank levers 286 are operably mounted upon the upturned arms 292 of a U-shaped member 294 secured to the adjacent side of the bracket 190, Figs. 8, 9, 10 and 11. One of the bell-crank levers 286 has an additional arm 296 which is held in contact with a wear plate 298 by a coil spring 300 attached at one end to the pin element of the pin-and-slot connection 290 and at its opposite end to the supporting member 236. The wear member 298, which is pivotally connected at its lower end to a support 302 secured to the adjacent side of the bracket 192, is yieldably held by the arm 296 in contact with the cam 244 so that when the high radius 304 on the circumference of said cam contacts with said wear member 298 it will push the same rearwardy from the position shown by Fig. 8 to that disclosed by Fig. 9, and, through the intermediary of the intervening parts, swing the folding devices 280 in opposite directions to the position shown by Fig. 9 and thus permit the blades 224 to move outwardly as above described. The high radius 304 of the cam 244 is of such length as to permit the folding devices 280 to move inwardly against the blades 224 during the inward movement of the latter so that immediately after said blades clear said folding devices 280 the latter will be drawn toward each other, to complete the folding of the wrapper, through the intermediary of the spring 300 and intervening mechanism.

After the tray 138 has been drawn inwardly to its seat in the saddle 198 as above described, the rotary carrier 181 rotates step by step and carries the studs 228 along the eccentric surface 306 of stationary cams 308 and thus restores the blades 224 to their innermost positions as shown at the upper portion of Fig. 9. One of the cams 308 is fixed to the stationary shaft 184 and the other to the bracket 192, Fig. 8.

Referring now more particularly to the gearing whereby the different parts of the machine are driven, 309 designates a small sheave fixed upon the shaft of the motor A and arranged to drive a large sheave 310 through the intermediary of an endless belt 311. The large sheave 310 is fixed upon a horizontal shaft 312 journaled in a casing 314, Fig. 3, provided in its lower portion with an oil reservoir 316 to lubricate the shaft bearings 318 and a set of speed reduction gears comprising a worm 320, fixed upon the shaft 312, and a worm wheel 322 fixed upon a vertical shaft 324 and intermeshing with the worm 320.

The vertical shaft 324 is journaled in bearings 326 and provided at its upper end with a small slidably mounted gear wheel 328, Figs. 1 and 27, equipped with a handle 330 whereby said gear 328 may be moved vertically upon the shaft 324 to throw it in or out of mesh with the large gear wheel 78. The handle 330 is driven by the shaft 324 through a feather 332 projecting into a groove 340 in the handle 330. The shaft 324 has a spring member 334 that automatically springs outwardly beneath and supports the handle 330 when the same is raised to throw the small gear wheel 328 into mesh with the gear wheel 78. When it is desired to lower the handle 330 to throw the gear 328 out of mesh with the gear wheel 78, the upper portion of the support 334 is forced into a recess 336 in the shaft 324 in order to clear the handle. The downward movement of the handle 330 is checked by a shoulder 338 formed at the upper end of the groove 340. In order to prevent vibration of the upper unsupported end of the shaft 324 when in operation, I provide a stub shaft 344 over which the gear wheel 328 slips when raised into mesh with the gear wheel 78. The stub shaft 344 is fixed to a bracket 346 secured to the upper portion of the yoke 88. The lower end of the vertical shaft 324 is provided with a fixed bevel gear 348 which continuously drives a smaller bevel gear 350 when the machine is in operation. The small bevel gear 350 is fixed upon the rear end of the shaft 178, which latter is journaled in bearings 352 and 354 at the front and rear portions, respectively, of the table 2.

Figure 4:
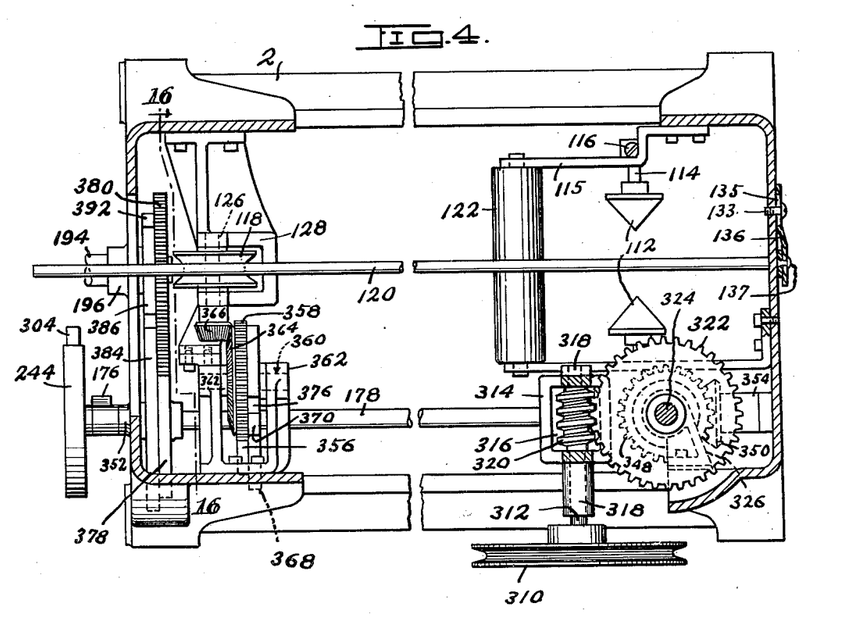
Fig. 4 is an irregular horizontal sectional view on line 4—4 of Fig. 3, with some parts removed and others added.

From the foregoing it will be understood that the shaft 178 is continuously driven at low uniform speed from the motor A through the intervening speed reduction gearing, but since the feed roller 118 must advance the strip of paper 108 the length of a wrapper during each pause of the rotary carrier 181, I provide an intermittent movement for driving said feed roller 118 at a higher speed than the shaft 178. As shown by Figs. 4 and 16, said movement comprises a mutilated cog wheel 356, fixed upon the shaft 178 and which, at each revolution, rotates a cog wheel 358 one step equal in the present instance to a quarter of a revolution. The cog wheel 358 is fixed upon a short shaft 360 journaled in bearings 362 and provided with a large fixed bevel gear wheel 364 which drives a small bevel gear wheel 366 fixed upon the shaft 126 carrying the feed roller 118.

During each pause of the feed roller 118 it is locked from accidental movement by a stop comprising a disk 368, fixed upon the shaft 178, and a wheel 370 fixed upon the shaft 360. The periphery of the disk 368 successively enters the concave peripheral portions 372 of the wheel 370 and thus locks the same from rotation until the cog wheel 356 intermeshes with the cog wheel 358. The disk 368 has a peripheral recess 374 which permits passage one by one of peripheral projections 376 on the wheel 370 during the operation thereof.

Figure 15:
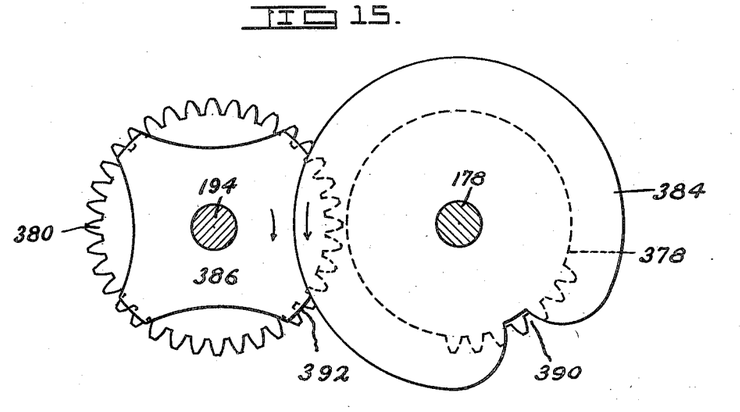
Fig. 15 is a front elevation of intermittent and lock gearing for controlling the movements of a rotary carrier, the shafts of said gearing being in cross section.

The shaft 194, which drives the rotary carrier 181, is driven on step during each pause of the feed roller 118 by an intermittent movement similar to that which drives said feed roller 118. Said movement comprises a mutilated cog wheel 378, fixed upon the shaft 178, and a cog wheel 380, fixed upon the shaft 194, Figs. 4 and 15. The cog wheel 378, at each revolution, intermeshes with and rotates the cog wheel 380 one-fourth of a revolution. A stop similar in construction and operation to the one above described is also provided for locking the shaft 194 from accidental movement when at rest, comprising a disk 384, fixed upon the shaft 178, and a wheel 386 fixed upon the shaft 194. The disk 384 has a peripheral recess 390 for successive passage of the peripheral projections 392 on the wheel 386 which has four circumferential concave portions 388 into which the periphery of the disk 384 is adapted to successively enter during rotation of said disk.

Having described in detail the construction and to some extent the operation of the machine, I will now proceed with a further description of the operation.

After the materials to be shaped, cut into articles of uniform length, and wrapped, have been placed in bulk in the respective receptacles 6 and 8 the motor A is started and through the intermediary of the intervening gearing forces the plungers 38 and 40 downwardly so that they in turn will force the materials outwardly through the respective nozzles 24, 26 and upon the shelf 10 104 in the form of a cylindrical strip having a core of one kind of material covered with a jacket of another kind of material. After the strip has been forced outwardly upon the shaft 104 the proper length to form an article B, the cutter 106 is rotated one step to sever the strip close to the nozzle 26 and push the article from the shelf 104 onto the strip of paper 108, which has been previously fed out the proper distance upon the uppermost tray 138.

The operation of the rotary cutter 106 is effected by the reciprocatory knife 130 through the intermediary of the pawl 160 and the ratchet wheel 162 during the downward stroke of said knife 130. As the knife 130 moves downwardly its lower central portion starts to cut a wrapper C from the paper strip 108 but does not completely sever the paper until after the article B has dropped into the paper on the uppermost tray 138. By only cutting the central portion of the paper first the paper will be firmly held in position from lateral movement by its uncut longitudinal margins and the rod 120 until the article has dropped upon the paper, whereupon the latter is completely severed by the knife 130 as it approaches the end of its downward movement.

After the wrapper C has been severed from the strip 108 the rotary carrier 181 is started on one-fourth of a revolution by the intermittent movement 378, 380, and carries the lug 214 against the high radius of the stationary disk 218, thereby swinging the folding blade 204 from the position disclosed by Fig. 21 to that shown by Fig. 22 to initially fold one longitudinal margin of the wrapper C over the article B. About the time the initial fold is completed the other longitudinal side of the wrapper C is folded over the article by the blade 206 which is swung to the position shown by Fig. 23 through the intermediary of the lever 220 which is carried into engagement with the high radius of the cam 222. The ends of the wrapper C are then partially folded, Fig. 24, by the blades 224 which are pushed outwardly to the concentric grooves 232 by the studs 228 and the guides 230. Just before the carrier 181 completes the initial quarter of a revolution the lug 214 and lever 220 pass to the lower radii of the respective cams 218, 223, Fig. 11, and permit the springs 212 to restore the blades 204, 206, to open position so that the partially wrapped article may be carried into the trough 234 by the tray 138 which is pushed outwardly to the position disclosed by Figs. 9 and 11 by the blades 224. The blades 224 in turn are drawn outwardly by the reciprocatory members 238 and their controlling mechanism comprising the levers 240, roller 242, and the high radius 266 of the groove 262 in the cam 244.

As the blades 224 travel to the limit of their outward movement they cooperate with the sides of the trough 234 in folding the ends of the wrapper B to the position disclosed by Fig. 25. Continued rotation of the cam 244 carries the lower radius of the groove 262 into engagement with the roller 242 and thus causes the same to effect partial inward movement of the blades 224 to the position at the right side of the carrier, Fig. 10. The blades 224 remain in the last-mentioned position until restored to the limit of their inward movement, see upper portion of Fig. 10, by their respective studs 228 which are pushed inwardly by the eccentric surface of the stationary cams 308 as the carrier 181 completes its initial revolution.

When the blades 224 are moved inwardly part way as above-mentioned the tray 138 is drawn into its seat in the associated saddle 198 by the retractile springs 277. During the inward movement of the tray 138 the partially wrapped article moves backwardly therewith until checked and deposited in the trough 234 by the detents 276. The final folding operation is then completed by the folding devices 280 moving inwardly and folding the ends of the wrapper C against the back of the article B, Fig. 26.

The foregoing operations are repeated until the plungers 38 and 40 closely approach the bottoms of the respective receptacles 6 and 8, whereupon the motor A is automatically stopped by the transverse pin 53, which opens the switch 92 by depressing the lever 80. The plungers 38 and 40 may then be quickly raised above their respective receptacles 6 and 8 by removing the cross bar 54 and applying a suitable manually operated crank, not shown, to the upper rectangular ends of the stems 46 and 48 one at a time and rotating them in the proper directions. The last operation can be readily accomplished as the nuts 50, 52, remain stationary while the respective stems rotate and move upwardly through said nuts.

After the plungers 38 and 40 have been raised above the receptacles the yoke 88 and the parts carried thereby are swung to the dotted line position, Fig. 1, so that access may be readily had to the receptacles 6 and 8 to recharge them with other batches of material, or so that said receptacles and the nozzles 24 and 26 can be disconnected and removed preparatory to being sterilized.

From the foregoing description it is apparent that I have provided a machine which is well adapted for the purpose intended and while I have shown a preferred embodiment of the invention, I reserve all rights to such changes and modifications thereof as properly fall within the spirit and scope of the invention as claimed.

Having thus described my invention, what I claim and desire to secure by Letters Patent, is:

1. In a machine of the character described, a rotary carrier, mechanism for rotating said carrier step by step, trays spaced apart and operably mounted upon said carrier for the reception of wrappers and articles to be wrapped therein, the distance between trays being equal to each step of the carrier, folding devices operably mounted upon the carrier for folding the wrappers longitudinally around the respective articles, means for operating said folding devices while the carrier is in motion, pairs of blades reciprocably mounted upon the carrier for partially folding the ends of said wrappers around the ends of the respective articles, reciprocatory members having means for successively moving said blades outwardly a limited distance to partially fold the ends of the respective wrappers as specified and while the carrier is in motion, mechanism for moving said reciprocatory members outwardly, while the carrier is at rest, to effect greater outward movement of the blades and thereby further fold the ends of the respective wrappers and then restoring said reciprocatory members to their inward position to return the blades to their partially outward position, a trough for cooperating with the blades in folding the ends of the wrappers as said blades travel through said greater outward movement, cooperating means on each pair of blades and the respective trays for drawing the latter outwardly as said blades travel through said greater outward movement, resilient means for restoring the respective trays to their inward position as the blades move inwardly, means for depositing the partially wrapped articles into the trough as the respective trays return to their inward position, and means for completing the end folding operation of the wrappers.

2. In a machine of the character described, a rotary carrier, mechanism for rotating said carrier step by step, trays spaced apart and operably mounted upon said carrier for the reception of wrappers and articles to be wrapped therein, the distance between trays being equal to each step of the carrier, mechanism for folding the wrappers longitudinally around the respective articles while the carrier is in motion, blades reciprocably mounted upon the carrier for partially folding the ends of the wrappers around the ends of the respective articles while the carrier is in motion, reciprocatory members having guide means for successively moving said blades outwardly a limited distance to partially fold the ends of the wrappers as specified, levers for moving said reciprocatory members outwardly to effect greater outward movement of the blades and thereby further fold the ends of the wrappers and then restoring said reciprocatory members to their inward position to return the blades to their partially outward position, rotary cam means for actuating said reciprocatory members when the carrier is at rest, cooperating means on the blades and the trays for drawing the latter outwardly as the blades travel through said greater outward movement, means for restoring the trays to their inward position as the blades move inwardly, means for completing the end folding operation on the wrappers, and means for fully restoring the blades to their inward position.

3. In a machine of the character described, a rotary carrier, mechanism for rotating said carrier step by step, trays spaced apart and operably mounted upon said carrier for the reception of wrappers and articles to be wrapped therein, the distance between trays being equal to each step of the carrier, mechanism for folding the wrappers longitudinally around the respective articles while the carrier is in motion, blades reciprocably mounted upon the carrier for partially folding the ends of the wrappers around the ends of the respective articles while the carrier is in motion, studs projecting from said blades, reciprocatory members having guide means in the path of said studs to effect limited outward movement of the blades for partially folding the ends of the wrappers as specified, grooved means on said reciprocatory members concentric with the axis of the carrier for receiving the studs while the carrier is in motion, means for moving said reciprocatory members outwardly to effect greater outward movement of the blades and thereby further fold the ends of the wrapper and then restoring said reciprocatory members to their inward position to return the blades to their partially outward position when the carrier is at rest, cooperating means on the blades and the trays for drawing the latter outwardly as the blades travel through said greater outward movement, means for restoring the trays to their inward position as the blades move inwardly, a trough into which the partially wrapped articles are deposited as the trays move inwardly, folding devices for completing the end folding operations on the wrappers after the partially wrapped articles have been deposited in the trough, means for operating the last-mentioned folding devices, and means for fully restoring the blades to their inward position.

4. In a machine of the character described, a rotary carrier, mechanism for rotating said carrier step by step, trays spaced apart and operably mounted upon said carrier for the reception of wrappers and articles to be wrapped therein, the distance between trays being equal to each step of the carrier, mechanism for folding the wrappers longitudinally around the respective articles while the carrier is in motion, blades reciprocably mounted upon the carrier for partially folding the ends of the wrappers around the ends of the respective articles while the carrier is in motion, reciprocatory members having guide means for successively moving said blades outwardly a limited distance to partially fold the ends of the wrappers as specified, mechanism for moving said reciprocatory members outwardly to effect greater outward movement of the blades and thereby further fold the ends of the wrappers and then restoring said reciprocatory members to their inward position to return the blades to their partially outward position when the carrier is at rest, cooperating means on the blades and the trays for drawing the latter outwardly as the blades travel through said greater outward movement, means for restoring the trays to their inward position as the blades move inwardly, a trough into which the partially wrapped articles are deposited as the trays move inwardly, folding devices for completing the end folding operations on the wrappers after the partially wrapped articles have been deposited in the trough, levers for actuating said folding devices, spring means for moving said levers in one direction, cam means for moving said levers in the opposite direction, and means for fully restoring the blades to their inward position.

5. In a machine of the character described, a rotary carrier, mechanism for rotating said carrier step by step, trays spaced apart and operably mounted upon said carrier for the reception of wrappers and articles to be wrapped therein, the distance between trays being equal to each step of the carrier, mechanism for folding the wrappers longitudinally around the respective articles while the carrier is in motion, blades reciprocably mounted upon the carrier for partially folding the ends of the wrappers around the ends of the respective articles while the carrier is in motion, reciprocatory members having guide means for successively moving said blades outwardly a limited distance to partially fold the ends of the wrappers as specified, mechanism for moving said reciprocatory members outwardly to effect greater outward movement of the blades and thereby further fold the ends of the wrappers and then restoring said members to their inward position to return the blades to their partially outward position when the carrier is at rest, cooperating means on the blades and the trays for drawing the latter outwardly as the blades travel through said greater outward movement, means for restoring the trays to their inward position as the blades move inwardly, a trough into which the partially wrapped articles are deposited as the trays move inwardly, folding devices for completing the end folding operations on the wrappers after the partially wrapped articles have been deposited in the trough, levers for actuating said folding devices, spring means for moving said levers in one direction, cam means for moving said levers in the opposite direction, a wear member interposed between said cam means and one of the levers, and means for fully restoring the blades to their inward position.

6. In a machine of the character described, a rotary carrier, mechanism for rotating said carrier step by step, trays spaced apart and operably mounted upon said carrier for the reception of wrappers and articles to be wrapped therein, the distance between trays being equal to each step of the carrier, folding devices operably mounted upon the carrier for folding the wrappers longitudinally around the respective articles, means for operating said folding devices while the carrier is in motion, pairs of blades reciprocably mounted upon the carrier for partially folding the ends of said wrappers around the ends of the respective articles, reciprocatory members having means for successively moving said blades outwardly a limited distance to partially fold the ends of the respective wrappers as specified and while the carrier is in motion, mechanism for moving said reciprocatory members outwardly while the carrier is at rest, to effect greater outward movement of the blades and thereby further fold the ends of the respective wrappers and then restoring said members to their inward position to return the blades to their partially outward position, a trough for cooperating with the blades in folding the ends of the wrappers as said blades travel through said greater outward movement, cooperating means on each pair of blades and the resepective trays for drawing the latter outwardly as said blades travel through said greater outward movement, means for restoring the respective trays to their inward position as the blades move inwardly, means for depositing the partially wrapped articles into the trough as the respective trays return to inward position, means for completing the end folding operation of the wrappers, and means for fully restoring the blades to their inward position.

7. In a machine of the character described, a rotary carrier, mechanism for rotating said carrier step by step, trays spaced around said carrier for the reception of wrappers and articles to be wrapped therein, the distance between trays being equal to each step of the carrier, folding devices operably mounted upon the carrier for folding the wrappers longitudinally around the respective articles, means for operating said folding devices while the carrier is in motion, pairs of blades reciprocably mounted upon the carrier for partially folding the ends of said wrappers around the ends of the respective articles, reciprocatory members having means for successively moving said blades outwardly a limited distance to partially fold the ends of the respective wrappers as specified and while the carrier is in motion, mechanism for moving said reciprocatory members outwardly, while the carrier is at rest, to effect greater outward movement of the blades and thereby further fold the ends of the respective wrappers and then restoring said members to their inward position to return the blades to their partially outward position, a trough for cooperating with the blades in folding the ends of the wrappers as said blades travel through said greater outward movement, saddles fixed to the carrier and having seats for the trays, U-shaped members fixed to the trays and slidably mounted in said saddles, connections between said U-shaped shaped members and the reciprocatory blades whereby the latter are permitted to move outwardly a limited distance while the U-shaped members remain at rest and whereby said U-shaped members are drawn outwardly as the blades move outwardly through their greater distance, resilient means for restoring the U-shaped members to their inward position as the blades move inwardly, means for depositing the partially wrapped articles in the trough as the respective trays return to inward position with the U-shaped members, and means for completing the end folding operation of the wrappers.

8. In a machine of the character described, a rotary carrier, mechanism for rotating said carrier step by step, trays spaced apart and operably mounted upon said carrier for the reception of wrappers and articles to be wrapped therein, the distance between trays being equal to each step of the carrier, folding devices operably mounted upon the carrier for folding the wrappers longitudinally around the respective articles, means for operating said folding devices while the carrier is in motion, pairs of blades reciprocably mounted upon the carrier for partially folding the ends of said wrappers around the ends of the respective articles, reciprocatory members having means for successively moving the pairs of blades outwardly a limited distance to partially fold the ends of the respective wrappers as specified and while the carrier is in motion, mechanism for moving said reciprocatory members outwardly, while the carrier is at rest, to effect greater outward movement of the blades and thereby further fold the ends of the respective wrappers and then restoring said reciprocatory members to their inward position to return the blades to their partially outward position, a trough for cooperating with the blades in folding the ends of the wrappers as said blades travel through said greater outward movement, cooperating means on each pair of blades and the respective trays for drawing the latter outwardly as said blades travel through said greater outward movement, resilient means for restoring the respective trays to their inward position as the blades move inwardly, means for depositing the partially wrapped articles into the trough as the respective trays return to inward position, means for completing the end folding operation of the wrappers, and fixed means eccentric to the axis of the carrier for fully restoring the blades to their inward position.

9. In a machine of the character described, a rotary carrier intermittently operated, trays spaced apart and operably mounted upon said carrier adapted to receive wrappers and articles to be wrapped therein, folding devices operably mounted upon the carrier for folding the wrappers longitudinally around the articles, mechanism for actuating said folding devices while the carrier is in motion, blades radially mounted in pairs on the carrier adjacent to the ends of the trays, reciprocatory means for successively moving the pairs of blades outwardly a limited distance to partially fold the ends of the wrappers over the ends of the respective articles while the carrier is in motion, rotary cam means for moving said reciprocatory means outwardly to effect greater outward movement of the blades when the carrier is at rest to further fold the ends of the respective wrappers, said cam means being also adapted to return the reciprocatory means to inward position, a trough having sides for cooperating with the blades in folding the ends of the wrapper as said blades move to their extreme outward position, cooperating means on each pair of blades and the adjacent tray for moving the latter outwardly as said blades travel to the end of their outward movement, spring detents on the trough for cooperating with each tray in depositing each partially wrapped article into said trough, folding devices operably mounted at opposite sides of the trough for completing the folding operation, and means for actuating the last-mentioned folding devices.

10. In a machine of the character described, a rotary carrier, trays spaced apart and operably mounted upon said carrier for the reception of wrappers and articles to be wrapped therein, suitably actuated folding devices mounted upon the carrier for folding the wrappers longitudinally around the respective devices, radially disposed blades reciprocably mounted upon the carrier and adjacent to the ends of the respective trays, suitably actuated reciprocatory members for moving said blades outwardly to partially fold the ends of the wrapers around the ends of the articles, a trough for receiving the articles and cooperating with said blades in partially folding the wrappers around the ends of the articles, slidable connections between the blades and the trays whereby the latter are advanced towards the trough to deposit the partially wrapped articles in the latter, suitably actuated folding devices adjacent to the trough for completing the end folding operation, and stationary cam means for restoring the blades to their innermost position.

11. In a machine of the character described, a rotary carrier, trays spaced apart and operably mounted upon said carrier for the reception of wrappers and articles to be wrapped therein, suitably actuated folding devices mounted upon the carrier for folding the wrappers longitudinally around the respective devices, radially disposed blades reciprocably mounted upon the carrier and adjacent to the ends of the respective trays, studs projecting from said blades, suitably actuated reciprocatory means having guides and grooves the former extending at an angle and the latter arranged concentrically to the axis of the carrier, said guides projecting into the path of the studs to move the latter outwardly so they may enter said grooves during rotation of the carrier, a trough for receiving the articles and cooperating with said blades in partially folding the wrappers around the ends of the articles, slidable connections between the blades and the trays whereby the latter are advanced towards the trough to deposit the partially wrapped articles in the latter, suitably actuated folding devices adjacent to the trough for completing the end folding operation, and stationary cam means for restoring the blades to their innermost position.

12. In a machine of the character described, a rotary carrier, a tray mounted upon said carrier to receive an article and a wrapper therefor and shaped to partially fold the wrapper longitudinally around said article, two folder members pivotally mounted upon the carrier and extending outwardly at opposite sides of the tray for completing the longitudinal folding of the wrapper around the article, an element fixed to one of said folder members for moving the same towards its companion, a lever operably mounted on the carrier independently of the other folder member but adapted to move the latter towards its companion, stationary cam means for actuating the element and said lever while the carrier is in motion, and means for folding the ends of the wrapper over the ends of the article.

13. In a machine of the character described, a rotary carrier, a tray mounted upon said carrier to receive an article and a wrapper therefor and shaped to partially fold the wrapper longitudinally around said article, two folder blades mounted upon a common pivot on the carrier for completing the longitudinal folding of the wrapper, a lug fixed to one of said blades and adapted to swing the latter around one side of the tray, a lever pivotally mounted upon the carrier and adapted to swing the other blade around the opposite side of the tray, stationary cam means for actuating the lug and said lever while the carrier is in motion, and means for folding the ends of the wrapper over the ends of the article.

WILLIAM STRICKER.